United States Patent Office.

JOHN J. E. MAYALL, OF SOUTHWICK, COUNTY OF SUSSEX, ENGLAND.

METHOD OF PRODUCING UNCOLORED AND COLORED PHOTOGRAPHIC IMPRESSIONS.

SPECIFICATION forming part of Letters Patent No. 382,369, dated May 8, 1888.

Application filed July 26, 1887. Serial No. 245,361. (No specimens.) Patented in England April 5, 1887, No. 5,080; in France May 9, 1887, No. 183,445; in Belgium May 10, 1887, No. 77,396; in Denmark May 23, 1887; in Italy July 5, 1887, No. 21,751; in Spain August 1, 1887, No. 7,033, and in Norway October 12, 1887, No. 536.

*To all whom it may concern:*

Be it known that I, JOHN JABEZ EDWIN MAYALL, of Southwick, in the county of Sussex, England, a subject of the Queen of Great Britain, have invented a certain new and useful Method of Producing Uncolored and Colored Photographic Impressions, (for which I have received Letters Patent in England, No. 5,080, dated April 5, 1887; also, in Belgium, No. 77,396, dated May 10, 1887; also, in Denmark, dated May 23, 1887; also, in France, No. 183,445, dated May 9, 1887; also, in Italy, No. 21,751, dated July 5, 1887; also, in Norway, No. 536, dated October 12, 1887; also, in Spain, No. 7,033, dated August 1, 1887;) and I do hereby declare that the following is a full, clear, and exact description of the invention, which will enable others skilled in the art to which it appertains to make and use the same.

This invention has for its object the production of permanent photographic impressions, whether colored or uncolored, on any suitable material.

According to this invention, I first take a negative preferably by the electric light; but it may also be taken by sunlight in the ordinary way. I then print a positive on paper, porcelain, or other suitable material prepared as follows:

For paper I soak it in a weak solution of gelatine and lactate of iron in about the following proportions, viz: two grains of fish-glue or isinglass to one-sixteenth of a grain of lactate of iron in one ounce of water, the whole being boiled and subsequently filtered. The paper, after having been immersed for about three minutes in the above solution, is dried and smoothed. This may be done by placing it between blotting-paper and submitting it to a slight pressure. I next float the paper thus prepared for about two minutes on a bath composed as follows, viz: to about one ounce of albumen, (preferably that taken from fresh eggs,) four grains of sodium chloride, half a grain of potassium bromide, two minims (sixty minims equal one fluid dram) of glacial acetic acid, and one drop of a concentrated solution of silica, or of some compound of silica, or of a suitable hydrocarbon, or of salicylic acid. The whole must be beaten up into a frothy mass and allowed to settle for about twelve hours. Any tint may be given to this mass by adding the desired color dissolved in a saturated alcoholic solution in the proportions of about one minim of alcoholic solution to about four ounces of the albumen solution above described, and one minim of meconine. The whole is then beaten up and allowed to settle. After floating the paper, it is then dried by slow heat and ironed on the back to make it perfectly dry and smooth. I then prepare a bath of nitrate of silver and nitrate of soda and free ammonia in the proportions of about one ounce of water to forty grains of nitrate of silver, ten grains of nitrate of soda, and three minims of free ammonia, and when pliability of the paper is desirable I add to the bath five drops of glycerine per ounce of bath solution. The paper is then floated face downward on this bath for about two minutes and then dried in a dark-room, after which it is fumigated in an atmosphere of ammonia for from three to five minutes, and is then ready for printing upon in the ordinary way. The prints, after fixing, must be soaked in a weak solution of sulphuric acid to expel any trace of the hyposulphite of soda and well washed. The printed impression, in a moist state, is then mounted face uppermost on a piece of glass or skeleton frame, and when dried the colors prepared, as hereinafter described, are then dabbed on by suitable means and slightly stumped. The dabber which I find suitable for this purpose is a pad of fine cotton-wool pushed through a glass tube, so as to protrude therefrom, and cut square and even at the end. This cotton-wool must either be renewed for each color or a separate dabber, made as above, kept for each color. After the colors have been applied, the paper is rendered impervious to moisture by having applied to its back and front some such substance as white wax or paraffine or camphor, the print being sufficiently warmed for the purpose of the application of the wax. The colors must be stronger than are required for the final effect. The picture is then sprayed over or subjected to an atmosphere charged with a weak alcoholic solution of salicylic acid or some compound of silica or suitable hydrocarbon paraffine, for example, or of any preparation of fluorine to set the color, and then it is subjected to the action of finely-powdered soluble glass. This I propose to effect as follows: by placing powdered silica (or its compounds) in a suitably-closed chamber provided with shelves and fitted with bellows, so as to blow the powder of silica into a cloud. The colored picture is then put on one of the shelves to catch the fine dust of the silica for a very few seconds, after which it is taken out of the chamber. The picture (face downward) is then laid on a plate of glass coated in the following manner: After having rubbed the glass with a dabber of any suitable material, (for which I use a ball of cotton-wool coated with leather,) charged with powdered silica or French chalk, I coat it with collodion to which is added one drop per ounce of salicylic acid, and when dry I recoat it with gelatine and salicylic acid in about the proportions of one drop of acid to one ounce of gelatine, and again dry the plate. The surface of the print must now be moistened with some hydrocarbon—such as paraffine or kerosene in solution—to which is added a few drops of salicylic acid in the proportions of about two drops of salicylic acid to the ounce of hydrocarbon, and when sufficiently moist the picture is well pressed down upon the gelatine surface and allowed to dry in a warm atmosphere, after which it is stripped from the glass, and when mounted on card, porcelain, or other desired material produces a permanent and finely-colored photographic picture.

If it is desired to have a brilliant picture, it is necessary that the entire process above described should be conducted without any delay or intermission in the various portions of the process and in an atmosphere of increasing temperature, as if in the process the print is allowed to become chilled a dull appearance is the result, which dull appearance may, however, be sometimes preferred.

For printing on porcelain and such like material, I coat the material with collodio-chloride of silver or carbon tissue, or the albumen solution above described, the subsequent treatment being the same as that already described for paper.

For the production of uncolored photographs the process is similar to that above described, omitting the colors.

The colors I employ are preferably organic tints or colors, the coloring-matter of flowers, vegetable growths, and roots in a dry state ground up with phenic acid and silicate of potash or kerosene, and silicate of potash in alcohol in about the following proportions, viz: one ounce of dry color to sixty grains of phenic acid and twenty minims of silicate of potash, or sixty grains of kerosene to twenty minims of silicate of potash.

In the above manipulation care must be taken to exclude all organic matters other than what are above described.

Having fully described my invention, what I desire to claim and secure by Letters Patent is—

1. The method of producing uncolored photographic impressions, consisting of a bath to first soak the paper in composed of gelatine and lactate of iron; a bath to float the paper on composed of albumen, chloride of sodium, bromide of potassium, glacial acetic acid, and a derivative of silex; a sensitizing-bath composed of nitrate of silver, nitrate of soda, and free ammonia; the means for rendering the film slightly alkaline, consisting of fumigating the paper in an atmosphere of ammonia, and a weak solution of sulphuric acid to soak the print in to expel all traces of the hyposulphite, in about the proportions stated and as described.

2. The method of producing colored photographic impressions, consisting of a bath to first soak the paper in composed of gelatine and lactate of iron; a bath to float the paper on composed of albumen, chloride of sodium, bromide of potassium, glacial acetic acid, a derivative of silex, and coloring-matter previously dissolved in a mixture of alcohol and meconin; a sensitizing-bath composed of nitrate of silver, nitrate of soda, and free ammonia; the means for rendering the films slightly alkaline, consisting of fumigating the paper in an atmosphere of ammonia, a weak solution of sulphuric acid to soak the print in to expel all traces of the hyposulphite, attaching the print in a moist state on a sheet of glass or skeleton frame, face uppermost, and when dry dabbing on coloring-matter previously prepared with phenic acid, silicate of potash, and silicate of potash in alcohol; the means for rendering the paper impervious to moisture, consisting of the application of white wax, paraffine, or camphor to front and back of the paper; the means for setting the color consisting of an atmosphere charged with a weak alcoholic solution of salicylic acid, derivative of silex, paraffine, or a preparation of fluorine, dissolved in alcohol, sprayed over the pictures, and afterward applying finely-powdered soluble glass, and the means for finishing the picture, consisting of a plate of glass coated with collodion mixed with salicylic acid, and when dry recoated with gelatine and salicylic acid, moistening the print with a mixture of hydrocarbon and salicylic acid, laying the print upon the prepared surface of the glass, face downward, well pressed down, and allowed to dry in a warm atmosphere, all substantially as hereinbefore described.

3. In the method of producing photographic impressions, the means for preparing the paper consisting of the combination of a bath to first soak the paper in, composed of gelatine and lactate of iron, and a bath to float the paper on, composed of albumen, chloride of sodium, bromide of potassium, glacial acetic acid, and a derivative of silex or hydrocarbon, in about the proportions stated.

J. J. E. MAYALL.

Witnesses:
T. E. HALFORD,
THOMAS C. IVES.